Feb. 13, 1923.

B. C. WOODFORD.
CHUTE FOR COTTON AND THE LIKE.
FILED JULY 28, 1921.

INVENTOR.
Bronson C. Woodford
BY
Mitchell, Chadwick & Kent,
ATTORNEYS.

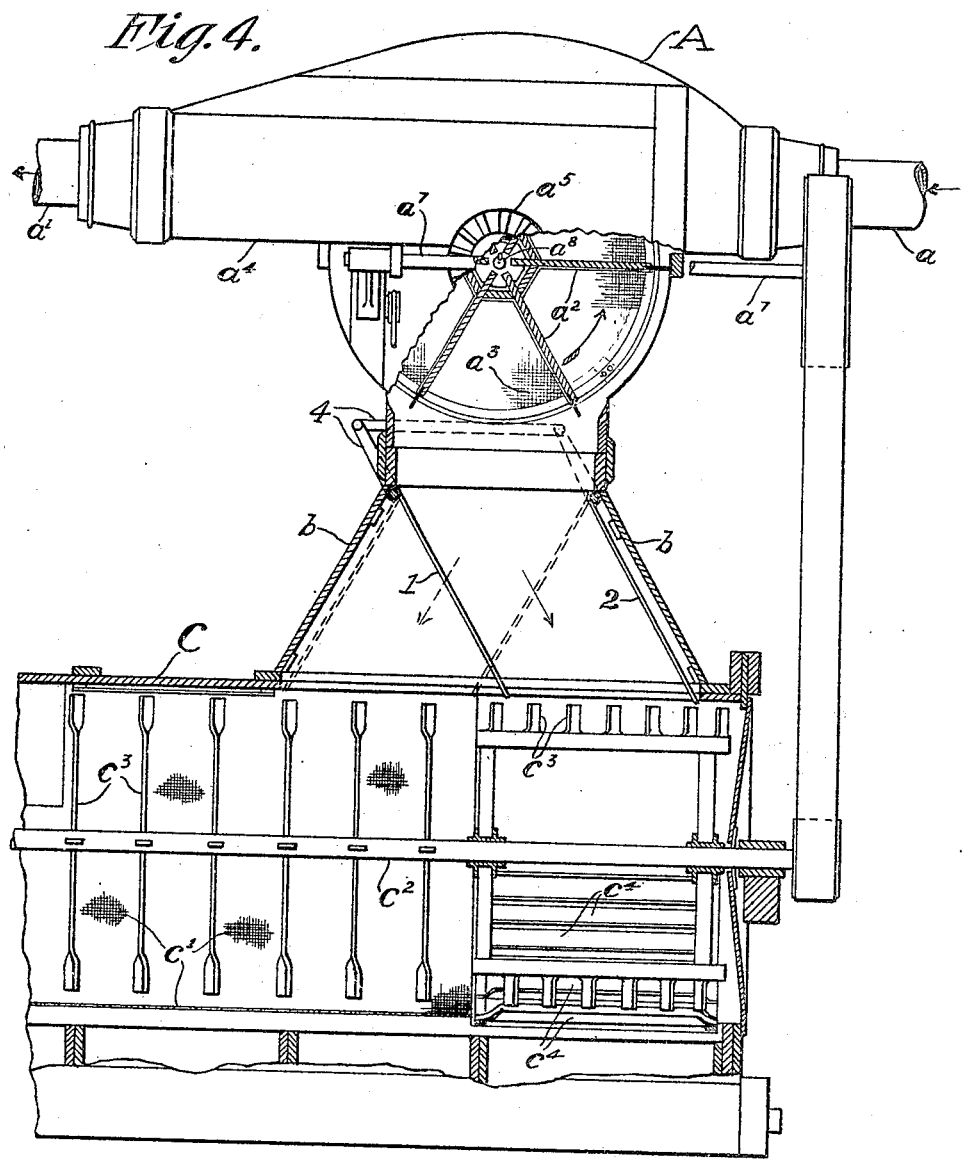

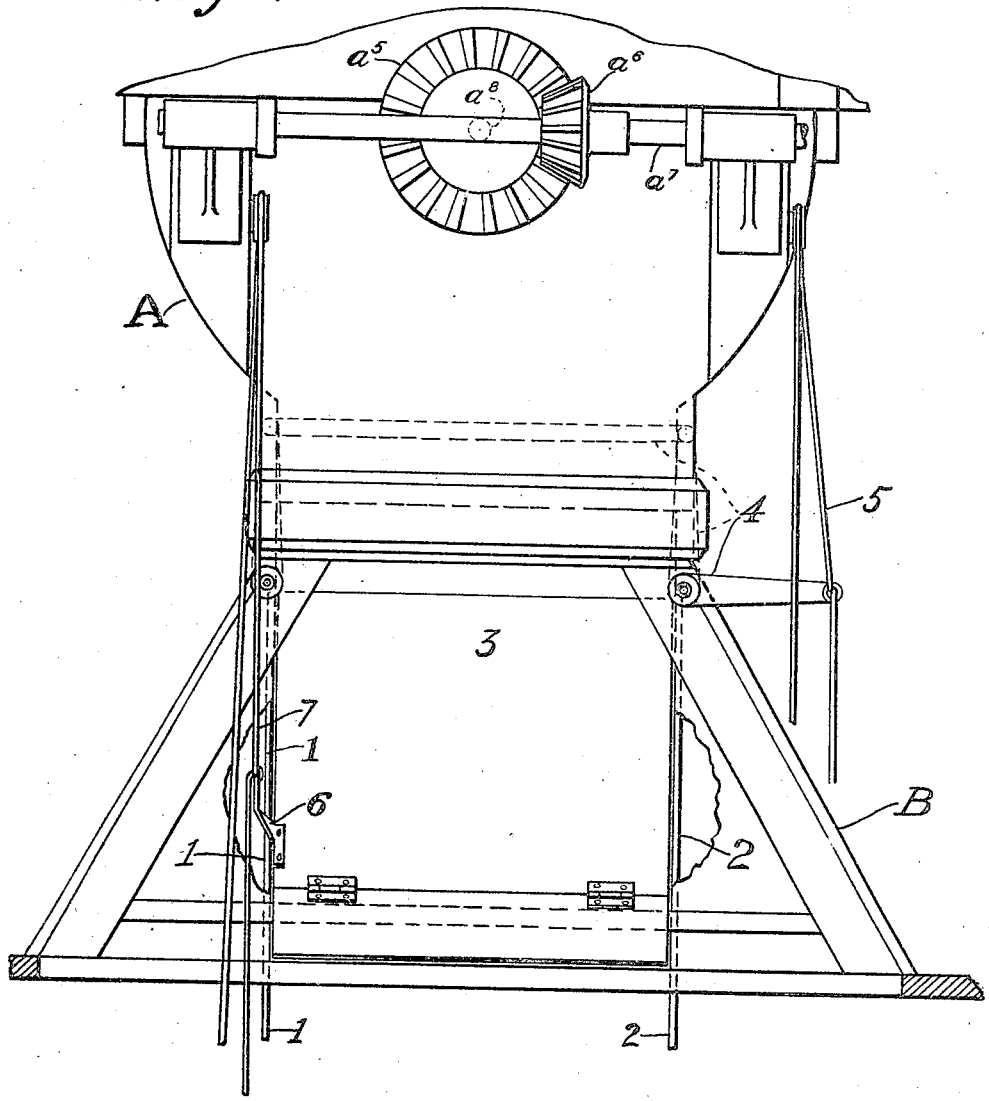

Patented Feb. 13, 1923.

1,445,379

UNITED STATES PATENT OFFICE.

BRONSON C. WOODFORD, OF DALLAS, TEXAS, ASSIGNOR TO THE MURRAY COMPANY, OF DALLAS, TEXAS, A CORPORATION OF TEXAS.

CHUTE FOR COTTON AND THE LIKE.

Application filed July 28, 1921. Serial No. 488,143.

*To all whom it may concern:*

Be it known that I, BRONSON C. WOODFORD, a citizen of the United States, residing at Dallas, in the county of Dallas and State of Texas, have invented certain new and useful Improvements in Chutes for Cotton and the like, of which the following is a specification.

My invention is an adjustable chute, designed to be introduced between a cotton supply and a cotton cleaning mechanism and a cotton conveying mechanism, whereby by suitable adjustment of the chute the cotton may be delivered into the cotton cleaning mechanism at a desired point of its cleaning surfaces, as may be required, according to the nature and condition of the cotton to be treated or may be delivered beyond the cleaning mechanism, to a belt or pneumatic cotton conveyor, or other mechanism, without passing through the cotton cleaning mechanism.

In the ginning of cotton, the seed cotton, taken either direct from the wagon in which it is brought to the ginnery or from a storage bin, is drawn into one end of a suction pipe, at the other end of which a suction fan is connected, and is carried by air currents up above a battery of gins, the cotton falling through the bottom of the pipe into the chutes of the respective gins in the battery.

Frequently, the seed cotton, as received at the ginnery, contains unopened bolls or excessive quantities of dirt, sand or leaf trash.
In such cases it is desirable to give the seed cotton a preliminary treatment before it is fed to the gins and this is accomplished by passing it through a machine made up of beater arms, mounted for rotation within a casing having at the inlet end bars against which the beater arms throw and break open any bolls contained in the seed cotton and at the middle and exit end, screens against which the cotton is beaten by the beater arms, as the seed cotton progresses through the machine. It is undesirable to beat the seed cotton in this manner, any more than is necessary to rid it of extraneous material, and for this reason it is desirable, when the seed cotton is free of bolls, that it should not be beaten upon the boll-breaking bars and when it contains little dirt or trash, it is desirable that it should be beaten over only such screen surface as is sufficient to remove the sand and trash and when it is clean it is desirable that it should not be passed through the cleaner.

My invention contemplates a seed cotton handling system in which the seed cotton shall be elevated, by an air current, induced in a conduit pipe by a fan operating in suction, to a point preferably higher than the gins; that at this higher point the seed cotton shall be separated from the air current by any suitable separating device, several such devices being well known in the art; that the seed cotton, after separation from the air current shall be passed into an adjustable chute, and by the chute directed and delivered as desired, to a boll breaker and cleaner, at the boll breaking end or to a cleaner on the screened surfaces, the cleaner delivering the treated cotton to a conveyor for delivery to the gins; or the chute may be adjusted to deliver the seed cotton, direct to the conveyor, without passing through the cleaner.

In the above arrangement the suction cotton elevator, the separator, the cleaner and the conveyor are all separately old and well known. The chute or valve is, so far as I know, new. The combination of the various old elements by means of the new chute is, so far is I know, new.

In the drawings:—

Figure 4 is a sectional elevation, on an enlarged scale, on line 4—4 of Figure 2, looking in the direction of the arrow;

Figure 5 is a longitudinal elevation, on an enlarged scale, of the three-way chute, the chute set as in Figure 2.

Figure 1:
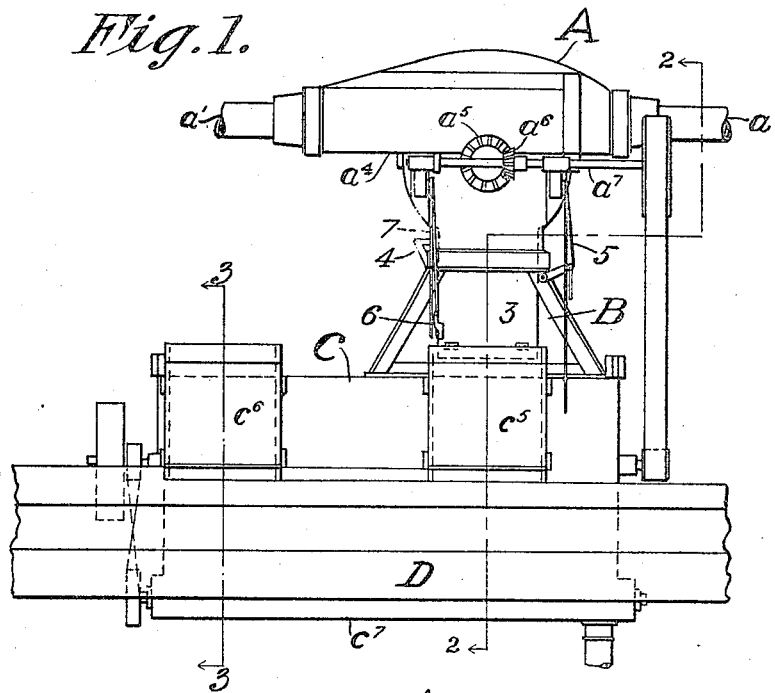
Figure 1 is a longitudinal elevation of the entire assembly, showing the chute set to deliver seed cotton to the boll-breaker end of the cleaner.

In Figure 1 I have shown the complete assembly of means to work my system. At the top is the separator A, below is the three-way chute B, below the chute is the cleaner C and at the bottom to one side of the cleaner, the conveyor D.

The separator may be of any type, several different kinds being now in use and well known. In the drawings I have shown a separator of the well known "paddle wheel" type. The well-known construction is sufficiently indicated in Figure 4. The separator is interposed in the suction pipe line of the pneumatic elevator system. One end, $a$, of this pipe goes to the seed cotton supply and the other end, $a'$, goes to the suction side of a fan. In the casing of the separator, is mounted for rotation, a paddle wheel, made up of a central shaft $a^8$ carrying paddles, $a^2$, forming (say) six V-shaped chambers. The outer ends and the sides of the paddles or partitions are provided with strips of rubber, which co-act with the flat sides and curved ends and bottom of the lower half of the separator casing to prevent the ingress of air from below during operation. Both ends of the paddle shell are covered by a circular sheet of wire mesh, $a^3$, indicated in Figure 4. At the upper side portions of the casing there are openings in the side walls of the casing communicating respectively with side air passages $a^4$.

Figure 2:
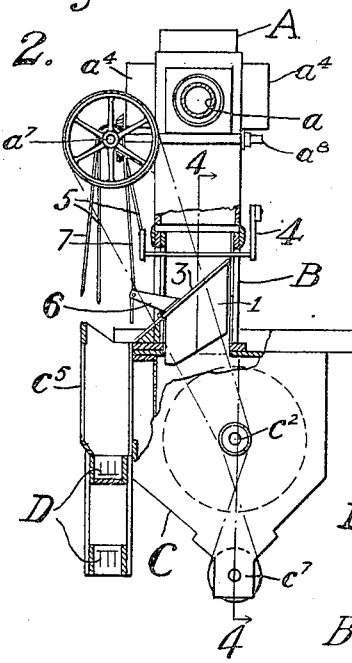
Figure 2 is an end elevation partly in section of the assembly shown in Figure 1, on line 2—2 of Figure 1, looking in the direction of the arrow, the chute being set to deliver seed cotton direct to the conveyor;

When the machine is in operation, the paddle wheel is slowly rotated, by any suitable means, say by a pair of bevel gears, $a^5$, $a^6$, gear $a^5$ being secured to the paddle wheel axis shaft $a^8$ and gear $a^6$ mounted upon a shaft, $a^7$, driven by a belt and pulleys from the shaft of cleaner C (see Figures 1 and 2). The fan being started the air is exhausted from pipe $a^1$, side air passages $a^4$, the upper V-shaped chambers and the pipe, $a$. Seed cotton is elevated in the pipe, $a$, and carried into one or more of the V-shaped chambers, which are opposite pipe $a$, the air passing through the side screens $a^3$ and side passages $a^4$ to the fan, leaving the seed cotton in the paddle-wheel chambers. The rotation of the paddle wheel in the direction of the arrow, Figure 4, carries the seed cotton down, out of the air suction, to the opening in the bottom of the separator casing through which the cotton drops by gravity. All this is old and well known and need not therefore be described with greater particularity.

Figure 3:
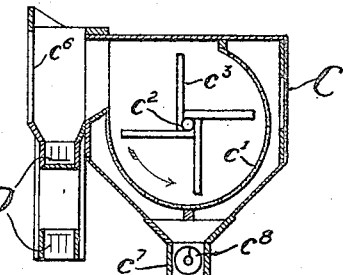
Figure 3 is a sectional elevation on line 3—3 of Figure 1, looking in the direction of the arrow.

The cleaner C is made up of a casing, within which is a curved wire mesh surface, $c'$ (see Figures 3 and 4), extending longitudinally thereof. In the central, longitudinal axis of the casing is mounted for rotation a shaft, $c^2$, carrying beater arms, $c^3$, the free ends of which are set at an angle, tending to move the seed cotton in a spiral path from the inlet end to the outlet end of the cleaner. At one end of the cleaner there is an inlet opening in the upper side of the casing (see Figures 2 and 4). At the inlet end of the casing is a series of bars, $c^4$, set longitudinally of the cleaner, and close to the path of the ends of the beater arms $c^3$, and against these bars are broken up, by the revolving arms, any bolls which may be in the seed cotton (see Figure 4). On one side of the cleaner are set two side hoppers $c^5$, $c^6$ (see Figures 1, 2 and 3). Hopper $c^5$ does not communicate with the interior of the cleaner, but is below and opposite the three-way chute B (see Figures 1 and 2). Hoppers $c^6$ communicates with the interior of the cleaner (see Figure 3). There is an opening along the entire length of the under side of the cleaner C below which, in a suitable enclosed channel, $c^7$, is arranged a screw conveyor $c^8$. Dirt and trash, falling through the screens gravitate to the conveyor, $c^8$, and are carried out of the machine.

Below the hoppers $c^5$, $c^6$, and parallel with the cleaner C is arranged a seed cotton conveyor D, of any desired type. In the drawings I have indicated the well-known belt conveyor.

My three-way chute B, is interposed between the separator A and the cleaner C, being set directly below the delivery opening of the separator and directly above the inlet opening of the cleaner. It consists of a casing having side walls, and preferably end walls, $b$ (see Figure 4). Between the side walls and at right angles thereto are hung two valves 1 and 2 and, preferably formed from a part of one of the side walls, a third valve 3 is hinged at one side to the side wall. I have shown valve 3 hinged at its lower edge to the lower side of the casing. It may, however, if desired, be hinged at its upper side to the upper side of the casing. In the latter case a removable door would be required in the opposite side of the casing to permit the egress of seed-cotton. Valves 1 and 2 are preferably linked together, by suitable linkage, 4, so that they may be simultaneously swung and secured in adjusted position as desired by manipulation of one flexible cord, 5. Valve 3 is operated by a bracket 6 moved by a flexible cord 7.

As I have set forth above, it is undesirable that seed cotton should be machined or handled, more than is necessary to produce the requisite end of a clean seed-cotton mass. If the seed cotton contains bolls, the chute C is adjusted as shown in full lines in Figure 4. The cord 5 is manipulated and secured to swing valves 1 and 2 into and hold in the position shown in full lines in Figure 4, valve 3 being set flush with the side wall of the casing of which, while in this position, it forms a part. Cotton falling from the separator A will be deflected by valve 1 and cast into the cleaner at the boll breaker end. If the seed cotton contains no bolls but is dirty with sand, trash or the like, the valves 1 and 2 are set in the position shown in dotted lines in Figure 4, by a suitable manipulation of cord 5, valve 3 remaining as before, the seed cotton thereupon being deflected by valve 2 away from the boll breaker to the screen surface of the cleaner. In either case the beater arms will operate upon the seed cotton, breaking the bolls and cleaning the seed cotton and finally ejecting it through the side of the cleaner into hopper $c^6$ and thus to the conveyor D by which it will be delivered to the gins.

In case the particular lot being operated upon is clean and needs no cleaning operation, valves 1 and 2 are set and secured in vertical position by proper manipulation of cord 5, as indicated in Figure 5 and valve 3 is set and secured in position, by means of cord 7, as shown in Figures 2 and 5. Cotton from the separator A will now be guided by valve 3, and valves 1 and 2, into the upper end of side hopper $c^5$ and so direct to conveyor D, without passing through the cleaner.

I claim:

1. The three-way chute above described, made up of a casing having side walls, one of said walls having an aperture therein, a pair of movable valves hung between the side walls at right angles thereto; means to move the valves and secure them in adjusted position; another movable valve set in the plane of the side wall and hinged thereto, means to adjust said valve; all organized to cause cotton entering the upper end of the casing to be deflected to either end of the lower end of the casing or to be passed out of the side of the casing, as desired.

2. The three-way chute above described, made up of a casing having side walls, one of said walls having an aperture therein; a pair of movable valves hung between the side walls at right angles thereto; means to move the valves and secure them in adjusted position; another movable valve set in an aperture of the side wall and hinged thereto at its lower side, all organized to cause cotton entering the upper end of the casing to be deflected to either end of the lower end of the casing or to be passed out of the side of the casing, as desired.

3. In combination, a pneumatic cotton-conveyor pipe; a rotary separator valve in the line of the conveyor pipe, to remove the cotton from the pipe and deliver it to the upper end of a cotton chute; that chute, as described in claim 1; a cleaner below the cotton chute and communicating therewith.

4. As in claim 3, a belt conveyor, adjacent the cleaner and below the level of the chute, for receiving cotton directly from the chute or from the cleaner according to the adjustment of the chute.

Signed at Dallas, Texas, this 22nd day of July, 1921.

BRONSON C. WOODFORD.